United States Patent [19]

Stencel

[11] 4,260,005

[45] Apr. 7, 1981

[54] SELF-LOCKING FASTENER, FASTENER SYSTEM, AND PROCESS

[75] Inventor: Edgar L. Stencel, Huntington Beach, Calif.

[73] Assignee: VSI Corporation, Pasadena, Calif.

[21] Appl. No.: 849,756

[22] Filed: Nov. 9, 1977

[51] Int. Cl.³ ..................... F16B 39/02; F16B 39/28
[52] U.S. Cl. ...................... 411/3; 411/167; 411/176; 411/273; 411/281; 411/416
[58] Field of Search ............... 29/520; 85/1 L, 7, 61, 85/62; 151/2 R, 2 A, 21 R, 21 C, 22

[56] References Cited

U.S. PATENT DOCUMENTS

| | | | |
|---|---|---|---|
| 930,450 | 8/1909 | Zinow | 151/2 A X |
| 1,172,427 | 2/1916 | Carlson | 85/1 L X |
| 2,713,882 | 7/1955 | Wilkes | 151/28 |
| 2,923,339 | 2/1960 | Skidmore | 151/21 B |
| 3,464,306 | 9/1969 | Reynolds et al. | 85/7 |
| 3,763,725 | 10/1973 | Reiland | 85/61 X |
| 3,854,372 | 12/1974 | Gutshall | 85/61 |
| 3,865,007 | 2/1975 | Stanback | 85/61 |
| 4,005,740 | 2/1977 | Villo | 151/21 C X |
| 4,061,367 | 12/1977 | Moebius | 285/382.2 |
| 4,074,011 | 2/1978 | Teramae et al. | 85/1 C X |

FOREIGN PATENT DOCUMENTS

| | | | |
|---|---|---|---|
| 222771 | 7/1959 | Australia | 151/22 |
| 2355189 | 5/1974 | Fed. Rep. of Germany | 151/22 |
| 1049239 | 11/1966 | United Kingdom | 85/62 |

Primary Examiner—Lawrence J. Staab
Attorney, Agent, or Firm—Christie, Parker & Hale

[57] ABSTRACT

A collar threads onto a shear pin. When the collar engages a surface of a workpiece, resistance to further threading increases. When sufficient resistance to threading occurs, a setting driver upsets lobes of the collar and forces these lobes radially inward toward the axis of the collar. Material of the collar inside the lobes responds to deformation of the lobes and flows radially inward against the shear pin to lock the collar, shear pin and workpiece together. The driver then rotates freely and a joint has been made with a predetermined clamp-up load and its component parts locked together.

34 Claims, 12 Drawing Figures

Fig. 8

SELF-LOCKING FASTENER, FASTENER SYSTEM, AND PROCESS

BACKGROUND OF THE INVENTION

The present invention relates to fasteners in general, and, more in particular, to fasteners that lock when set and that develop a predetermined clamp-up load while being set.

The venerable threaded fasteners consist of a nut and a bolt. The nut has internal threads that thread onto external threads of the bolts. Wrenching surfaces of the nut and bolt accept wrenches that tightly join the fasteners and one or more workpieces together. Broadly, another name for a bolt is a threaded pin, and another name for a nut is a collar.

Many environments in which fasteners are used require that the fasteners have extremely high integrity and strength. Fasteners must bear loads not only along their longitudinal axis but radially of the axis. More particularly, when fasteners join together two or more sheets and the sheets are loaded in their planes with different loads, one sheet tends to slide over the other. Fasteners passing through both sheets become loaded in shear during their resistance to this type of loading. Axial loads arise by the clamping of fastened sheets between a head of the pin on one side of the sheets and the collar on the other side of the sheets.

Fasteners quite often must respond well in environments where they are cyclically stressed under conditions that could give rise to fatigue failure. A fastener with adequate clamp-up load on it tends to resist fatigue failure.

An obviously desirable feature of a fastener is that it does not come apart in service. Variable devices have been used to keep a collar and a pin together. One way of locking the collar and pin is to deform the threads of the collar so that they bear in radial compression against the threads of the pin. The resistance to unthreading is purely frictional. The threads are commonly deformed at the factory in preference to the field, but field deformation has also been practiced.

It is also highly desirable to know just what clamping load the fastener applies to a structure. Clamp-up load correlates to the resistance of a collar to further threading onto a pin. As clamp-up force increases, the resistance to further threading increases and the torque required to turn the collar increases. This fact has been used in fasteners to develop a predetermined clamp-up load. In one prior art fastener, a wrenching section connects to a collar by a frangible breakneck that breaks upon the application of a predetermined torque that corresponds to the desired clamp-up load.

The features of a thread lock and a collar with a frangible breakneck for clamp-up load control have been combined in one collar. Regrettably, the combination has its shortcomings. A thread lock by deforming threads of the collar is effected at the factory. As such, the collar does not freely thread onto the shear pin. This makes setting somewhat difficult. Protective and lubricating coatings applied to the threads of the collar can be worn off in a collar having this type of thread lock by the considerable frictional drag between the threads of the collar and pin. The fact that a wrenching section separates from a threaded section of the collar creates a spare piece of the wrenching section that must be removed from the environment where the fastener is set. This is a nuisance. Where corrosion control is important, a circular band of bare material on the collar is created by failure of the breakneck. This band is not protected by corrosion inhibitors applied to the fastener when it was manufactured. This type of fastener is also comparatively expensive because it requires considerable machining in its formation. The frangible breakneck section must be of very close dimensional tolerances if reasonably close tolerances in breakoff torques are to exist. This problem is compounded by machine tool wear in the tools that make the part and also because the breakneck section becomes elliptical-shaped after the thread locking feature has been incorporated. Alternative methods of forming the frangible breakneck, such as roll forming, are not available because the part is hollow. The frictional drag between the shear pin and the collar in a fastener system employing a preexisting deformed thread lock results in a broad range in clamp-up force because the drag varies between large limits and is an important component in the resistance that effects failure of the frangible breakneck.

A second approach to a locking fastener system employs a pin that has an outer annular groove placed to be outside but near to one side of the structure being fastened. A collar is deformed radially inward into the groove so that collar material is restrained axially by radial walls of the groove. A condition of axial interference exists. In one type of such fastener a female threaded member threads onto a male threaded member with one setting tool. A second setting tool radially deforms the female member into the threads of the male threaded member.

SUMMARY OF THE INVENTION

The present invention provides a unique locking collar, fastener system comprised of a locking collar and a pin, and a process for use of the system.

The invention contemplates a locking collar having internal threads for receipt on male threads of a pin. The collar has at least one external lobe or rib. A driver bears against the lobe with a radial component of force, a component of force in the direction of the axis of the collar. When the resistance to rotation of the collar increases to a predetermined level after the collar engages the surface of a workpiece being fastened, the lobe yields in radial compression and displaces collar material radially inward of the lobe into locking engagement with the pin.

In a presently preferred embodiment of the present invention, the collar has an internally threaded, right cylindrical bore for cooperation with external threads of a pin. The pin can have a manufactured head or it can be a stud. A plurality of axially extending lobes on the outside of the collar and radially outward of the collar threads are the lobes that fail in radial compression. Preferably, the lobes are regularly spaced about a circle on the outside of the collar. A driver has flats that bear against these lobes to thread the collar onto the pin, and then to fail the lobes in radial compression and displace material of the collar radially inward of the lobes against the pin. The geometrical relationship between the surface of the lobes and the flats is the same for each lobe and flat so that each lobe and its backing material radially inside of it yield at the same applied torque. Void cavities or volumes on the shear pin index with the inside wall of the collar where material will protrude radially inward so that displaced material of the collar flows into the void spaces. The void volumes in this preferred embodiment result from axially extending flats. The spaces for deformed collar material are radially inward of the maximum radius of the flats so that after deformation the collar and the pin are secured together by rotational interference of collar material and shear pin material. The threads of the collar and pin are of sufficient axial extent outside the zone influenced by the lobes to provide axial interference between the threads in a standard manner. As is the case in conventional practice, means is provided to keep the shear pin from rotating with respect to structure and the collar during setting. These means may be a circular recess in the threaded end of the pin, for example a recess with hexagonal array of wrenching flats for a cooperating wrenching tool. In the case when the pin is a stud, the stud may be installed and tightened on the workpiece before the collar is threaded onto it. Because the fastener is torque sensitive, it is preferred to have all lobes concentric to the threads and of the same surface geometry. When the surfaces of the driver that engage the lobes each has the same geometry, failure of each lobe will occur at the same applied torque. A convenient lobe array is three lobes of equal radius from the axial centerline of the collar's threads. Each lobe has a convex curvatures in radial planes and the curvature of the lobes are equal to each other. To make it easy to install a driver, it is also preferred that the lobes be situated equal angular distances from each other for example, 120° apart.

Preferably, the collar has a comparatively large bearing end to distribute clamp-up load on the workpiece and reduce unit loading on the workpiece. To guide the driver over the lobes, the lobes preferably are beveled at their tops. To pilot the driver in rotation, the collar preferably has a right cylindrical section just below the lobes for cooperating with a similar right cylindrical section of the driver. The void volumes or cavities of the pin preferably are formed by an array of hexagonal, longitudinally extending flats. The fastener components can have any desired corrosion inhibiting surface treatment or lubrication. For example, the fastener can be cadmium plated and can have a lubricant of cetyl alcohol on their threads.

The present invention provides, among other advantages, an inexpensive, self-locking, load determining fastener system, that sets easily, provides a very effective rotational lock, and can have surface treatment that is not affected by rotational lock or load determining functions. The collar threads freely onto the threads of the pin until the collar engages the workpiece. Thereupon resistance builds up until the lobes fail in radial compression. Failure occurs in but a few degrees of arc and therefore the amount of clamp-up load on the structure being fastened is determined accurately within close limits. With the failure of the lobes, the setting driver turns freely on the collar indicating that the fastener system is set. Load deformation is without throw away pieces. Corrosion inhibitors and lubricants are not affected by this deformation. The fastener can be made inexpensively, in contrast to fasteners that require close tolerances at a breakneck.

These and other features, aspects and advantages of the present invention will become more apparent from the following description, appended claims and drawings.

DESCRIPTION OF THE PREFERRED EMBODIMENTS

Figure 1:
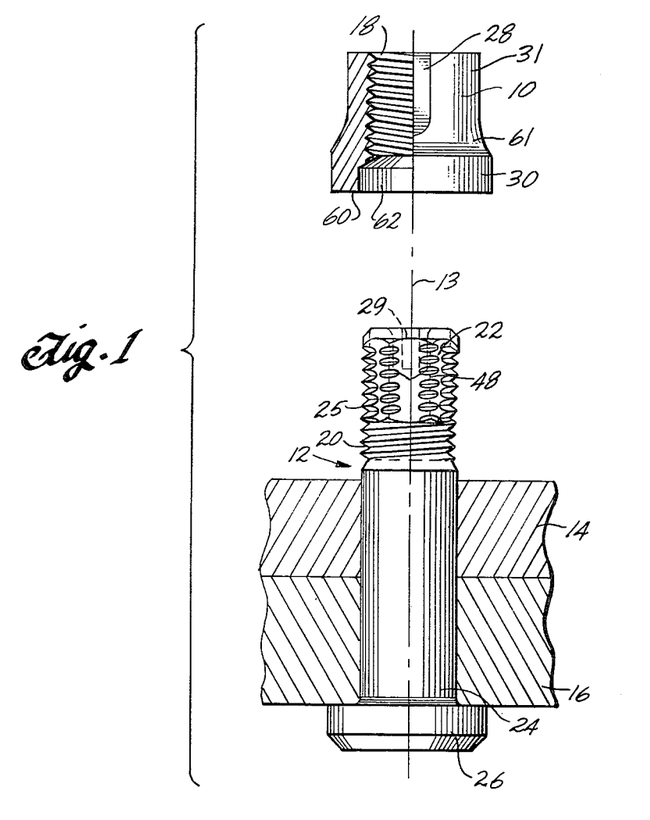
FIG. 1 is an expanded, elevational view of the collar and shear pin of the present invention, with the collar being shown partly in half section and the pin being shown in a pair of sheets.

FIG. 1 shows a locking collar 10 and a shear pin 12 which together form a fastening system. The collar and pin have a common axis 13. A pair of sheets 14 and 16 receive the shear pin. The collar has an internally threaded bore 18. Bore 18 is circular and the threads are not deformed to form a thread lock. Thus the threads project onto planes radial to axis 13 as congruent circular rings—and not elliptical rings. The shear pin has male threads 20 at one end of the pin. These threads receive the threads of the locking collar. The threads are rolled over hexagonal flats 22 of the pin. As will be developed, these flats define void volumes or cavities for receipt of material of the locking collar. The pin has an unthreaded shank 24 received in aligned holes in workpieces in the form of sheets 14 and 16. A manufactured head 26 of the pin bears on an exposed surface of sheet 16 to develop axial clamp-up load on the sheets in cooperation with locking collar 10. Flats 22 extend an axial distance along the pin. The threads are not fully developed on the flats, as indicated at 25. The threads below the flats and above shank 24 are fully developed and are indicated by reference numeral 27. The shear pin has a wrenching recess 29 on its threaded end.

Figure 2:
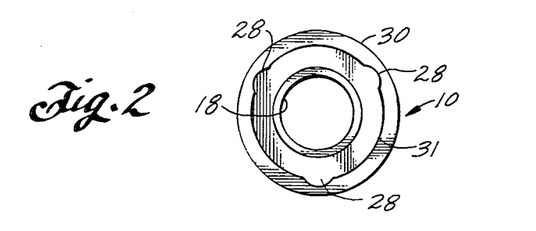
FIG. 2 is a top plan view of the collar of FIG. 1.

The locking collar has a plurality of external, axially extending ribs or lobes 28. In plan view these lobes are regularly spaced apart in a circular array. Specifically, the lobes are spaced angularly from each other an equal amount. The lobes in radial planes with respect to axis 13 have convex outward, circular curvature. The radius of curvatures of all the lobes are equal. The lobes extend purely axially. An axial wall 31 of the collar between lobes is right cylindrically curved with a center of curvature on axis 13.

A base or foot 30 of the collar has a diameter larger than the balance of the collar in order to reduce unit loading on the sheets.

With this brief description in mind, a brief description of the operation of the fastener system of the invention will aid in understanding the structural requirements of the system. The operation description will be presented with reference to FIGS. 4 through 8.

Figure 4:
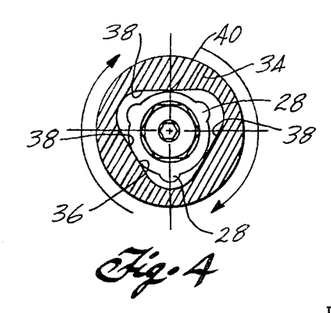
FIG. 4 shows a driver inserted over the collar of the previous Figures for threading onto the threads of the shear pin.
Figure 5:
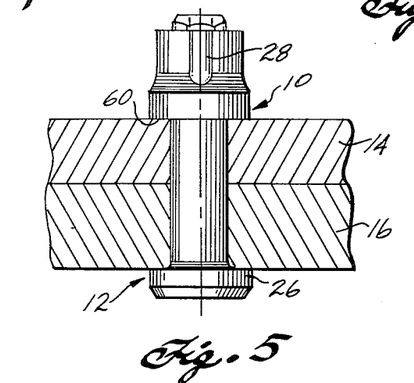
FIG. 5 shows the collar and shear pin of the previous figures clamping a pair of sheets, but before the design clamp-up load has been reached.
Figure 6:
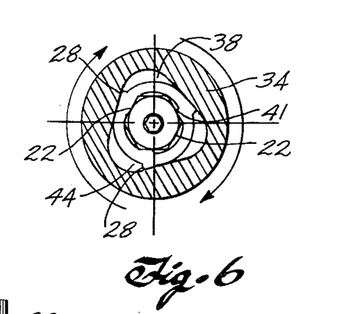
FIG. 6 illustrates the collar and shear pin of the previous figures as lobes of the collar begin to fail under the force of the driver and collar material radially inward of the lobes begins to flow into void volumes defined between the shear pin and the collar.

In FIGS. 4 and 6 a driver 34 has a deltoid socket 36 with three flat sides 38. These sides approach the center of the driver, which correspond to axis 13 of the fastener system, at a point of minimum radius, such as shown at 40. On either side of these points the radius to the sides increases from the center. The point of minimum radius approaches the radius of the collar between the lobes. Lobes 28 are engaged by the sides of the driver. The action of the driver on the lobes as the driver is rotated clockwise threads the collar down on threads 20 of the shear pin. The driver does not deform the lobes at this time because the resistance to rotation during this phase of making a joint is slight. FIG. 5 shows the fastener system as it appears with the collar abutting one side of the pair of sheets and the head of the shear pin abutting the other side. With continued rotation of the driver, resistance to rotation increases. As can be seen in FIG. 6 the driver sides engage the lobes and produce both radial and tangential components of force on the lobes, with these directions being taken with respect to the axis of the fastener system. The radial component of force begins to flatten the lobes into the body of the collar. The material thus displaced pushes material on the inside of the collar into void spaces defined between the flats of the shear pin and the collar. In FIG. 6, the displaced material on the inside of the collar is shown by reference numeral 44 protruding into what was formerly a cylindrical bore. Geometrical considerations attending deformation will be described subsequently with reference to FIG. 12.

Figure 7:
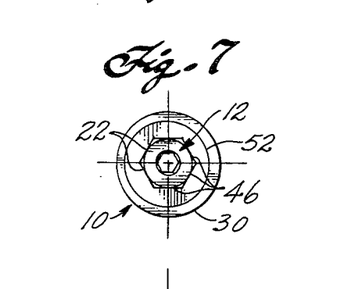
FIG. 7 illustrates the collar and shear pin of the previous figures in top plan view after the lobes have failed and the void volumes have been filled with collar material.
Figure 8:
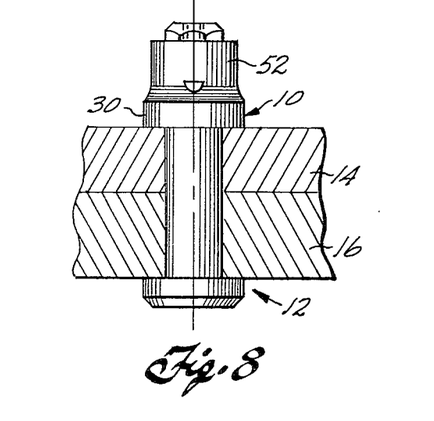
FIG. 8 shows a joint effected by the collar and shear pin of the previous figures and sheets after the lobes have been displaced into the body of the collar and collar material forced into the voids.

With reference to FIGS. 7 and 8, after the driver completely erases the lobes, it is free to turn on the collar and an operator knows that a joint has been effected. The void volumes existing previously between the collar and the flats now are substantially completely filled with displaced collar material and the inside of the collar takes on a hexagonal configuration in conformance with the hexagonal configuration of the pin flats. This is shown by reference numeral 46 in FIG. 7. A rotational lock now exists. The fastener cannot be unthreaded. Furthermore, the wrenching means has disappeared with the formation of this rotational lock. Because the ribs or lobes deform and disappear within a few degrees of rotation of the driver, corresponding to the angle subtended by each lobe, axial clamp-up is never an independent function of the resistance of the collar to rotation on the pin and clamp-up can be accurately controlled and predicted. Stated differently, resistance to rotation of the collar is a function of the axial load applied by the sheets onto the collar. This loading loads the flanks of the threads between the collar and the pin. As the load on the flanks increases, so does the frictional resistance to turning. Eventually the resistance to turning exceeds the yield strength of the lobes and the fastener is set. As distinguished from thread locks with predeformed threads, removal of the axial load removes the frictional drag on the flanks of the threads. In this connection because rotational lock-up is not effected until displacement of collar material into the void volumes, the collar can freely thread onto the threads of the pin without meaningful resistance. This means that setting is easier and any lubricant or corrosion protection on the threads will not be worn away by friction. Threading and lock-up are all effected by a single tool.

Figure 3:
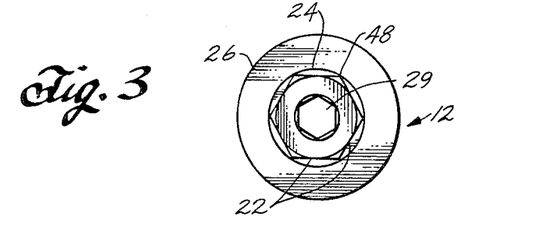
FIG. 3 is a top plan view of the end of the shear pin of FIG. 1 that receives the collar.

With reference again to the first three figures, pin flats 22 can be produced by extrusion and are of sufficient length along the axis of the fastener to accommodate desired grip variation. Grip is the thickness of the sheets that can be fastened by the fastener. The flats and the cooperating circular axial bore of the locking collar clearly illustrate the cavities or void volumes. The radius to the edge between adjacent flats, the edge being shown in FIGS. 1 and 3 by reference numeral 48, is greater than the radius to any other point on each of the flats. This radius is representative of the radius to material of the locking collar. Thus the void volumes in this embodiment can be viewed as the area outside of the chord of a circle to the arc of the circle subtended by the chord. In aggregate, the void volumes are represented by the areas outside of a hexagon and within a circumscribing circle. The third dimension of the volumes is axially along the lengths of the flats. Obviously, there must be sufficient volume to accept all of the displaced rib or lobe material so that the rib will completely deform and merge into the body of the collar and leave a completely right cylindrical outside surface of the collar upon the setting of a joint. (Such a surface is shown in FIGS. 7 and 8 by reference numeral 52. This right circular configuration represents the curvature of the surface of the collar between the lobes before lobe failure.)

The void volumes can be defined by other configurations. It is only necessary that the lobes register with the volumes when the ultimate strength of the lobes has been reached. With the hexagonal form, registration is always assured even if the lobes are on the same radius as the edge of the flats, for the lobes will then be displaced into two volumes. The hexagonal form, and other forms that meet the collar threads only along lines or edges, avoids any possibility of having material from the collar unable to flow freely into void volumes because of a failure to index. Again, it is only necessary to provide sufficient volume for the acceptance of all the displaced lobe material. For this material to act effectively as a rotational lock it should be radially within the confines of the locking collar. Any material that escapes out of the top of the collar will not be as effective as material within the collar. The void volume should be sufficient to accommodate differences in grip. At maximum grip the collar will end up further away from the manufactured head of the shear pin than at minimum grip. Void volume should be adequate for both extremes.

Examples of void volumes provided by other structures include splines on the surface of the shear pin. The interstices between the crests of the splines and the axial length of the splines and radially inside the collar threads provide the volumes. Indeed, it is not necessary to have a void volume at all in the sense of developing positive axial rotational interference. The space between the threads of the collar and the standard threaded shear pin will provide a volume for the displacement of lobe material and a friction type thread lock. The advantage of rib disappearance can be forborne so that not even this space would be required to be of adequate volume to accept a volume corresponding to the volume of the lobes. This will mean of course that the lobe will still be in place for purchase of a wrenching tool and there will not be a positive indication of when the predetermined clamp-up load has been reached.

The number of lobes on the locking collar need not be the three illustrated. The relationship between the number of lobes and the number of flats illustrated need not be followed either. In the illustrated embodiments, there are three lobes to six flats. This relationship can be varied. In some applications it may be desirable to increase the number of lobes while effecting the same amount of interference with the shear pin in order that less collar material for each lobe be displaced.

The number of lobes need not correspond to the number of flats of the driver. In the illustrated embodiments the driver has three flats for the three lobes of the locking collar. A greater number of collar lobes than forming tool flats results in a progressive deformation of the collar in the zone of the lobes and a lower setting torque requirement of the tool that drives the driver. It also reduces the clamp-up load on the sheets over what such load would be when the greater number of lobes are failed simultaneously.

The particular driver configuration can also change. The three flats shown could be replaced by just a single flat so that there would be a progression of steps in lobe deformation.

The relationship between the driver flats and lobes during the development of the lock should be one that produces radial failure of the collar in the zone of the ribs or lobes, and not shearing of the ribs from the collar. The ribs would shear from the collar with a sufficient tangential component of force. There must be some shear component on the lobes. Obviously the required relationships exist when the loading of the collar is dominantly radially inward, and not tangential. The cross section surface of the ribs as continous convex curves, as shown, is not critical. The ribs could have a surface which is wedge-shaped in cross section, for example.

The collar can be formed of a work hardenable material. This has the attraction of increasing the strength of the collar where it interferes with the shear pin as a joint is being made, instead of at some earlier time.

Completing the details of the description of the first embodiment, the collar has a foot 30 that presents an annular bearing surface 60 to a sheet. The surface area available for bearing is comparatively large and the unit loading on the sheet comparatively small. The foot is right cylindrical. A transition section 61 fairs smoothly into right cylindrical surface 31 from the foot. An axial counterbore 62 within this foot provides space for a seal, for example. It also provides a pilot to the threads and allows for grip variation. The collar can be made of any number of materials. One example is 2024 aluminum. The collar can have a thread lubricant. Examples are cetyl alcohol, solid film lubricant, and lauric acid lubricant. The surface of the aluminum can be conditioned, as by anodizing. The part can be heat treated.

The shear pin can have a manufactured head of any number of standard configurations. It can also be a stud. For example, the manufactured head need not be protruding but can be of the type that recesses into a counterbore in sheet 16. The shank diameter need not be the same as the major thread diameter. In the illustrated embodiment, a non-circular wrenching recess 29 accepts a wrenching tool. The wrenching tool prevents rotation of the shear pin during setting of the locking collar. Obviously other means can be provided to prevent the shear pin from rotating. For example, the manufactured head can have wrenching flats. The shear pin can be made in different materials, for example, alloy steel. The part can have a lubricant plate, as in the collar. The part can have a protective coating, such as cadmium plate or an aluminum coating.

Figure 9:
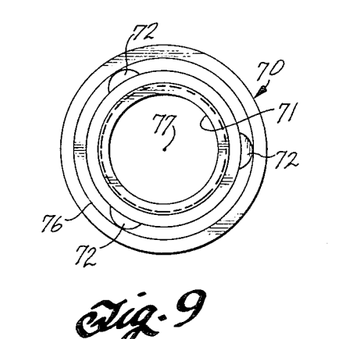
FIG. 9 illustrates in top plan view the preferred form of the collar of the present invention.
Figure 10:
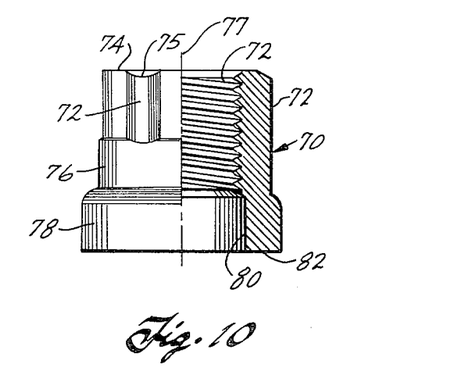
FIG. 10 illustrates in elevational view, partly in half section, the preferred collar of FIG. 9.

With reference to FIGS. 9 and 10, the preferred form of the locking collar is shown by reference to numeral 70. As before, this collar has an internally threaded, right cylindrical bore 71. There is no preformed thread lock. Three axially extending ribs or lobes 72 extend from an upper end of the collar to a pilot surface 76. An axially extending, exterior surface 74 between lobes is right cylindrically curved. The lobes are beveled at 75 at their tops to facilitate receipt of a driver. Pilot surface 76 is right cylindrical and it has a diameter corresponding to a right cylindrical female surface of a driver. It will be noted that the radius of the pilot surface corresponds to the maximum radius of each of the lobes. The pilot surface and the beveled lobe tops are the structure that makes this embodiment preferred. Except for the lobes, the collar constituents are concentric on a common axis 77. The lobes are again bounded on their outside by circularly curved surfaces, as viewed in planes radial of axis 77. All the lobes have equal curvatures on their outside surfaces. The radii to corresponding points on the surfaces of all the lobes from axis 77 are the same.

As before, a foot 78 of the collar is counterbored at 80 and is a substantially right cylindrical section. A bearing surface 82 at the base of the foot is to abut the surface of a workpiece, say a sheet.

It will be noted that the amount of lobe material that must be displaced in the FIGS. 9 and 10 embodiments is slightly less than in the earlier embodiment.

Figure 11:
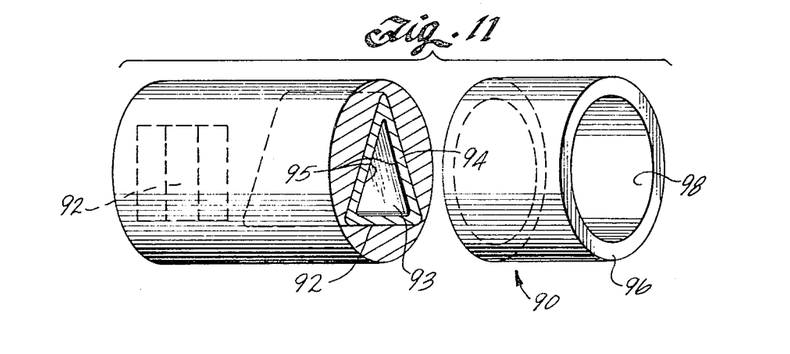
FIG. 11 illustrates in perspective a suitable driver for the collar of FIGS. 9 and 10.

FIG. 11 illustrates a driver 90 suitable for driving the locking collar of FIGS. 9 and 10. The driver is generally cylindrical on its outside and has a standard driving socket 92, square in cross section, for accepting a driving lug of a tool. A deltoid form socket 93 of the previously described tool has been preserved and thus the three lobes of the collar are deformed at the same time. In radial cross section, this deltoid socket traces an equilateral triangle with rounded corners. The socket has an insert 94 that defines the bearing surfaces for bearing against the lobes. This insert can be made of a material with good wear characteristics. The insert can be made removable and replaced by a second insert for setting a locking collar having lobes of different radius. Sides 95 of insert 94 do the actual bearing on the lobes. A nose 96 of the driver has a right cylindrical bore 98 corresponding in diameter to the diameter of pilot section 76 or foot 78. The bore fits over the pilot section.

The considerations that go into the locking collar of FIGS. 9 and 10 which have not been explicitly set forth here have been set forth with reference to the embodiment of the invention that was first described.

Figure 12:
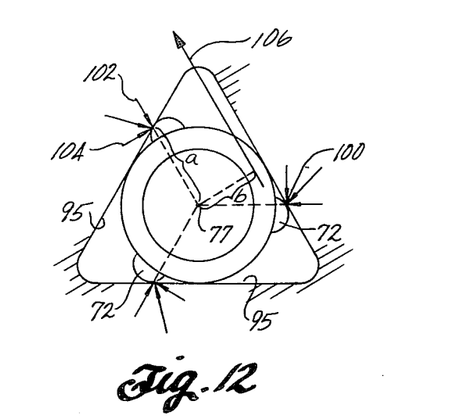
FIG. 12 illustrates vectorially the correlation between applied torque and clamp-up load.

FIG. 12 illustrates the relationship between the driver geometry and the lobe geometry that correlates with torsional resistance to tightening and failure of the lobes and material of the collar radially inward of the lobes. In the Figure, the illustrated collar corresponds to the collar of FIGS. 9 and 10. As such, each of lobes 72 has a circular curvature in radial planes. The driver is of deltoid form as illustrated in FIG. 11. The closest distance from axis 77 of the collar to each of sides 95 of the driver is equal to the radius of the collar at right cylindrical surface 74, the surface angularly adjacent to the lobes. Given the constraints of the deltoid form driver that has a closest distance to the axis of the collar corresponding to the radius of the cylindrical outside surface of the collar angularly adjacent to the lobes, the circular (in radial planes) curvature of the lobes, and the radius of curvature of the lobes, an initial point of contact 100 on each lobe by each driver side 95 results. This initial point of contact is at a distance "a" from axis 77. As the driver rotates the collar, it will engage the collar at 3 points on the lobes, each point corresponding to point 100. The collar will apply a force along the radius of curvature of the lobe, which is not a radius from axis 77. This force can be broken into components acting radially of the axis of the fastener and tangentially thereto, as shown by vectors 102 and 104, respectively. The total tangential load on the collar is three times the tangential load on a single lobe. This load is resisted by the frictional force between the threads of the collar and the threads of the pin, and the frictional force between the bearing surface at the foot of the collar and the workpiece. As will be recalled, the frictional force between the threads is a direct function of the clamp-up load on the workpieces. The aggregate or total force resisting rotation of the collar is shown by a vector 106 and it acts through a distance b. As vector 106 increases in magnitude, so must the tangential load on the lobes. The radial load on the lobes, however, bears a fixed relationship to the tangential force on the lobes, as determined by the geometry of the loading, until the lobes begin to yield. Thus, as the tangential loads increase, the radial loads increase in direct proportion. Since the tangential loads are directly related to the loads resisting rotation by the requirement that the sum of the moments about axis 77 must be zero, the radial loads also are directly related to the resisting loads.

When there is yielding of the lobes, the geometry of the contact between the lobes and the driver changes. The lobes tend to flatten and the driver tends to rotate clockwise (as viewed in FIG. 12) with respect to the lobes. This increase is in the radial loads, but the tangential loads stay the same. Yielding will occur primarily radially but there will be some tangential yielding. It all occurs rapidly and in only a few degrees of arc, as previously discussed.

For predictability of results the lobe geometry and driver geometry should be regular. Preferably the lobe geometry is the same for all lobes and has the same relationship to driver side geometry regardless of which side is presented to which lobe. Obviously the material strength of the material that will yield should be the same in all zones of yielding from the start of yielding to the finish of yielding.

The present invention has been described with reference to certain preferred embodiments. The spirit and scope of the appended claims should not, however, necessarily be limited to the foregoing description.

What is claimed is:

1. For use with a pin having external threads to make a joint with at least one sheet, an improved load limiting and self-locking collar comprising:
   (a) the collar having an axial bore;
   (b) internal threads in the axial bore for threaded receipt on the external threads of the pin;
   (c) at least one lobe on the outside of the collar for engagement by a driver and failure in radial compression upon the application of a predetermined load thereon by the driver in conjunction with the sheet, the lobe having an external surface for engagement by the driver that parallels the axis of the bore; and
   (d) the collar radially inward of the lobe and the lobe being plastically deformable such that upon sufficient engagement by the driver in a rotational direction tending to tighten the collar on the pin and against the sheet to produce in conjunction with the sheet the predetermined load the lobe deforms radially inward and displaces material of the body ahead of the deforming lobe into the axial bore and into a relationship with the pin that rotationally locks the collar and pin together.

2. The improved collar claimed in claim 1 wherein the lobe is radially outward of the internal threads.

3. The improved collar claimed in claim 1 wherein there is a plurality of the lobes regularly spaced from one another on the outside of the collar, all the lobes being of equal surface curvature, and all the lobes having equal radii to corresponding points on their surfaces.

4. The improved collar claimed in claim 3 wherein the lobes have a convex curvature in planes radial of the axis of the bore and normal to that axis.

5. The improved collar claimed in claim 4 wherein the collar has a foot with an axial counterbore opening into the internally threaded bore, the foot being for bearing on the sheet.

6. The improved collar claimed in claim 1 wherein the lobe has a beveled top for ease of receipt of the driver.

7. The improved collar in claim 1 wherein the collar has a pilot section axially of the lobe, the pilot section, in planes radial of the axis of the bore and normal to such axis, being circular, the pilot section being for receipt on a cooperating section of the driver to rotationally guide the driver about the axis of the bore.

8. The improved collar claimed in claim 7 wherein the lobe has a beveled top for ease of receipt of the driver.

9. The improved collar claimed in claim 8 wherein the lobe has a convex curvature in planes radial of the axis of the bore and normal to that axis.

10. The improved collar claimed in claim 9 wherein there is a plurality of lobes equally spaced from one another in planes radial of the axis of the axial bore and containing the axis, all the lobes having equal curvature, and radii from the axis of the axial bore to corresponding points on the surfaces of all the lobes being equal.

11. The improved collar claimed in claim 9 wherein there is a plurality of the lobes spaced regularly from one another on the outside of the collar.

12. An improvement in a collar of the type having an axial bore with internal threads for threaded receipt on external threads of a pin, the bore having an axis, the collar and the pin being capable of cooperating together to develop a desired clamp-up load on a workpiece under the collar, the improvement comprising:
   (a) a plurality of substantially identical lobes on the outside of the collar, the lobes being equally spaced radially of the axis, and being spaced apart from each other in planes radial to the axis and containing the axis, the lobes containing a predetermined and equal volume of material, the surface of each lobe extending axially of the collar and being substantially parallel to the axis, and the lobes being capable of acting as wrenching surfaces for a driver; and (b) each of the lobes and the material of the collar radially inward of the lobes being plastically deformable to develop plastically deformed material within the bore corresponding to the predetermined volume of the lobe and a lock that rotationally couples the collar and pin together, the yield strength of the lobes and the plastically deformable material of the collar radially inward of the lobes and the surface curvature of the lobes coacting to produce the plastic deformation at a predetermined applied load of the driver on the lobes tangential with respect to the axis of the bore that corresponds to the desired clamp-up load on the workpiece, the applied load resulting from the reaction to the clamp-up load by the workpiece.

13. The improvement claimed in claim 12 wherein the lobes are equally spaced in planes radial to the axis and containing the axis.

14. The improvement claimed in claim 12 wherein the internal threads are circular as viewed along the axis.

15. The improvement claimed in claim 12 wherein the lobes are radially outward of the internal threads.

16. The improvement claimed in claim 12 wherein the internal threads are circular as viewed along the axis, the lobes are radially outward of the internal threads, and the internal threads have a lubricant coating.

17. The improvement claimed in claim 16 wherein the collar has a protective coating.

18. A fastener system comprising:
(a) a collar having an axial bore and internal threads in the axial bore, the internal threads as viewed along the axis of the bore being circular;
(b) at least one lobe on the outside of the collar for engagement by a driver, the lobe having a surface that substantially parallels the axis of the bore;
(c) the lobe and collar material radially inward of the lobe being plastically deformable in response to radial compressive forces of predetermined magnitude applied by the driver in concert with a workpiece corresponding to the yield strength of the lobe and the material radially inward of the lobe such that with such deformation both the lobe and the material radially inward thereof flow radially inward with the lobe tending to merge into the balance of the collar and the radially inward material protrudes into the axial bore;
(d) a pin having external threads for receipt of the internal threads of the collar; and
(e) means of the pin for cooperating with the collar and applying a clamp-up load on a workpiece; whereby, upon reaching the yield strength of the lobe and material radially inward thereof, during the development of a clamp-up load on a workpiece, the lobe and radially inward material flow radially inward against the pin to rotationally lock the pin and collar together.

19. The fastener system claimed in claim 18 wherein the collar and the pin cooperate to define a void volume for each of the lobes to receive the material of the collar that flows radially inward and protrudes into the bore, the void volume having a surface on the pin that has varying radii from the axis of the pin such that upon the material of the collar protruding into the bore and inward into the void volume the rotational lock is effected by rotational interference between the collar and the pin.

20. The fastener system claimed in claim 19 wherein there is a plurality of the lobes on equal radii from the axial bore.

21. The fastener system claimed in claim 20 wherein the lobes are equally spaced with respect to one another in planes radial to the axis of the bore and containing the axis.

22. The fastener system claimed in claim 21 wherein each of the lobes has a beveled top to facilitate receipt of a driver and the collar has a right cylindrical pilot section axially of the lobes.

23. A self-locking and load determining fastener system comprising:
(a) a pin for receipt in a hole in a workpiece and having an externally threaded section;
(b) a collar having a right cylindrical bore with an axis, a workpiece bearing end for compressively engaging a workpiece in an axial direction, and internal threads in the bore for threaded receipt on the external threads of the pin; and
(c) at least one axially extending lobe on the lateral outside of the collar, the surface of the lobe paralleling the axis of the bore, the lobe surface configuration and the physical strength of the lobe and material of the collar radially inward of the lobe and toward the axis of the bore effecting plastic deformation of the lobe and such material to form a plastically yielded zone in response to a predetermined radial compressive load on the lobe, the predetermined radial compressive load being directly a function of a load applied to the lobe by a driver which is tangential with respect to the axis of the bore, the plastically yielded zone having the lobe merged into the balance of the collar and the material radially inward of the lobe protruded into the cylindrical bore;
whereby, progressively threading the collar with the driver onto the threads of the pin while the collar compressively bears on the workpiece increases the resistance of the collar to such threading and upon reaching a predetermined resistance the predetermined radial compressive load is reached and the plastically yielded zone created, the plastically yielded zone bearing against the pin and creating a rotational lock between the collar and the pin.

24. The self-locking and load determining fastener system claimed in claim 23 wherein there is a plurality of the lobes regularly spaced from one another on the outside of the collar, all the lobes being of equal surface curvature, and all the lobes having equal radii to corresponding points on their surfaces.

25. The self-locking and load determining fastener system claimed in claim 24 wherein the lobes have a convex curvature in planes radial of the axis of the bore and normal to such axis.

26. The self-locking and load determining fastener system claimed in claim 25 wherein each of the lobes has a circular curvature in planes radial of the axis of the bore and normal to such axis.

27. The self-locking and load determining fastener system claimed in claim 25 wherein the lobes have a beveled top for ease of receipt of the driver.

28. The self-locking and load determining fastener system claimed in claim 27 wherein the collar has a pilot section axially of the lobes, the pilot section in planes radial of the axis of the bore and normal to such axis being circular, the pilot section being for receipt on a cooperating section of the driver to rotationally guide the driver about the axis of the bore.

29. The self-locking and load determining fastener system claimed in claim 24 wherein the pin has means cooperating with the collar to define void volumes to receive the protruded material of the plastically yielded zone.

30. The self-locking and load determining fastener system claimed in claim 29 wherein the means of the pin that cooperates with the collar to define void volumes includes a plurality of surfaces extending axially of the pin, each surface being separated from adjacent surfaces by edges and each surface having radii to the axis of the pin which are less than the maximum radius from such axis to such surface.

31. The self-locking and load determining fastener system claimed in claim 30 wherein the axially extending surfaces are defined by flats.

32. The self-locking and load determining fastener system claimed in claim 28 wherein the pin has means cooperating with the collar to define void volumes to receive the protruded material of the plastically yielded zone.

33. The self-locking and load determining fastener system claimed in claim 32 wherein the means of the pin that cooperates with the collar to define void volumes includes a plurality of surfaces extending axially of the pin, each surface being separated from adjacent surfaces by edges, and each surface having radii to the axis of the pin which are less than the maximum radius from the axis to such surface.

34. The self-locking and load determining fastener system claimed in claim 33 wherein the axially extending surfaces are defined by flats.

* * * * *

REEXAMINATION CERTIFICATE (1800th)
United States Patent [19]

Stencel

[11] B1 4,260,005

[45] Certificate Issued Sep. 22, 1992

[54] SELF-LOCKING FASTENER, FASTENER SYSTEM AND PROCESS

[75] Inventor: Edgar L. Stencel, Huntington Beach, Calif.

[73] Assignee: VSI Corporation

Reexamination Reqs:st:
No. 90/002,222, Dec. 6, 1990
No. 90/002,247, Jan. 4, 1991

Reexamination Certificate for:
Patent No.: 4,260,005
Issued: Apr. 7, 1981
Appl. No.: 849,756
Filed: Nov. 9, 1977

[51] Int. Cl.[5] .................. F16B 39/02; F16B 39/28
[52] U.S. Cl. ............................. 411/3; 411/167; 411/176; 411/273; 411/281; 411/416
[58] Field of Search ............................... 411/2-5, 411/417, 418, 427, 429, 361, 937, 937.2; 81/471, 121.1, 124.6, 186

[56] References Cited

U.S. PATENT DOCUMENTS

| | | | |
|---|---|---|---|
| 930,450 | 8/1909 | Zinow | 411/277 |
| 1,172,427 | 2/1916 | Carlson | 16/108 |
| 1,389,927 | 9/1921 | Ball . | |
| 2,202,240 | 5/1940 | Trotter | 81/124.6 |
| 2,596,885 | 5/1952 | Booth | 29/517 X |
| 2,713,882 | 7/1955 | Wilkes | 411/206 X |
| 2,897,867 | 8/1959 | La Torre | 411/281 |
| 2,923,339 | 2/1960 | Skidmore | 411/937.1 X |
| 3,464,306 | 9/1969 | Reynolds et al. | 411/361 |
| 3,603,132 | 9/1971 | Holmes | 29/517 X |
| 3,763,725 | 10/1973 | Reiland | 411/2 X |
| 3,792,933 | 2/1974 | Stencel | 403/19 |
| 3,854,372 | 12/1974 | Gutshall | 411/1 |
| 3,865,007 | 2/1975 | Stanback | 411/2 |
| 3,920,338 | 11/1975 | Dahl | 403/284 X |
| 4,005,740 | 2/1977 | Villo et al. | 411/167 |
| 4,061,367 | 12/1977 | Moebius | 285/382.2 |
| 4,074,011 | 2/1978 | Teramae et al. | 428/422 |
| 4,383,353 | 5/1983 | Stencel | 29/517 |

FOREIGN PATENT DOCUMENTS

| | | |
|---|---|---|
| 222771 | 7/1959 | Australia . |
| 6602955 | 7/1969 | Fed. Rep. of Germany . |
| 1675031 | 12/1970 | Fed. Rep. of Germany . |
| 1750585 | 2/1971 | Fed. Rep. of Germany . |
| 2355189 | 5/1974 | Fed. Rep. of Germany . |
| 34118 | 1/1913 | Sweden . |
| 1049239 | 11/1966 | United Kingdom . |

*Primary Examiner*—Lloyd A. Gall

[57] ABSTRACT

A collar threads onto a shear pin. When the collar engages a surface of a workpiece, resistance to further threading increases. When sufficient resistance to threading occurs, a setting driver upsets lobes of the collar and forces these lobes radially inward toward the axis of the collar. Material of the collar inside the lobes responds to deformation of the lobes and flows radially inward against the shear pin to lock the collar, shear pin and workpiece together. The driver then rotates freely and a joint has been made with a predetermined clamp-up load and its component parts locked together.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-17, 19-34 are cancelled.

Claim 18 is determined to be patentable as amended.

New claims 35 and 36 are added and determined to be patentable.

18. A fastener system comprising:
(a) a collar having an axial bore and internal threads in the axial bore, the internal threads as viewed along the axis of the bore being circular;
(b) at least [one lobe] *three equally spaced lobes* on the outside of the collar for engagement by a driver[,] *having at least three faces for applying a radial force on each lobe,* [the] *each* lobe having a surface that substantially parallels the axis of the bore;
(c) the lobe and collar material radially inward of [the] *each* lobe being plastically deformable in response to radial compressive forces of predetermined magnitude applied by the driver in concert with a workpiece corresponding to the yield strength of the *respective* lobe and the material radially inward of the lobe such that with such deformation both the lobe and the material radially inward thereof flow radially inward with the lobe tending to merge into the balance of the collar and the radially inward material protrudes into the axial bore;
(d) a pin having external threads for receipt of the internal threads of the collar; [and]
(e) means [of] *on* the pin for cooperating with the collar and applying a clamp-up load on a workpiece; *and*
(f) *a plurality of void volumes on the pin for receiving material of the collar that deforms radially inwardly and protrudes into the bore upon deformation of the lobes, the void volumes forming a surface on the pin that has varying radii from the axis of the pin, the number of void volumes on the pin being sufficiently greater than the number of lobes on the collar to assure that material radially inward from each lobe can flow into a void volume;* whereby, upon reaching the yield strength of the [lobe] *lobes* and material radially inward thereof, during the development of a clamp-up load on a workpiece, the [lobe] *lobes* deform [and] radially [inward] *inwardly* and material [flow] radially inward [against] *from the lobes flow radially inward, so that a portion of the material of the collar protruding into the bore flows into such a void volume on* the pin to rotationally lock the pin and collar together.

*35. A fastener system comprising:*
*a collar having an axial bore and internal threads in the axial bore, the internal threads as viewed along the axis of the bore being circular;*
*three equally spaced apart, substantially identical, convex lobes on the outside of the collar for engagement by a driver having three faces for applying a load dominantly radially inwardly on the lobes and space between the faces for receiving the lobes when the driver is placed on the collar, each lobe having a surface that substantially parallels the axis of the bore;*
*the lobe and collar material radially inward of each lobe being plastically deformable in response to radial compressive forces of predetermined magnitude applied by the driver in concert with a workpiece corresponding to the yield strength of the respective lobe and the material radially inward of the lobe such that with such deformation both the lobe and the material radially inward thereof flow radially inward with the lobe tending to merge into the balance of the collar and the radially inward material protrudes into the axial bore;*
*a pin having external threads for receipt of the internal threads of the collar;*
*a plurality of void volumes interrupting a portion of the thread on the pin, the number of void volumes on the pin being sufficiently greater than the number of lobes on the collar for assuring that material radially inwardly from each lobe flows into a void volume; and*
*means on the pin for cooperating with the collar and applying a clamp-up load on a workpiece;*
*whereby, upon reaching the yield strength of the lobe and material radially inward thereof, during the development of a clamp-up load on a workpiece, the lobe and radially inward material flow radially inward and material inwardly from each lobe flows into void volumes on the pin to rotationally lock the pin and collar together.*

*36. A fastener system claimed in claim 35 wherein the volume of the void volumes is sufficiently large to accept all of the material displaced inwardly from the lobes.*

* * * * *